(12) United States Patent
Barhate et al.

(10) Patent No.: US 10,296,533 B2
(45) Date of Patent: May 21, 2019

(54) METHOD AND SYSTEM FOR GENERATION OF A TABLE OF CONTENT BY PROCESSING MULTIMEDIA CONTENT

(71) Applicant: YEN4KEN, INC., Princeton, NJ (US)

(72) Inventors: Sanket Sanjay Barhate, Mumbai (IN); Sahil Loomba, Ghaziabad (IN); Ankit Gandhi, Raipur (IN); Arijit Biswas, Kolkata (IN); Sumit Negi, Bangalore (IN); Om D Deshmukh, Bangalore (IN)

( * ) Notice: Subject to any disclaimer, the term of this patent is extended or adjusted under 35 U.S.C. 154(b) by 438 days.

(21) Appl. No.: 15/203,868

(22) Filed: Jul. 7, 2016

(65) Prior Publication Data

US 2018/0011860 A1     Jan. 11, 2018

(51) Int. Cl.
  *G06F 17/30*     (2006.01)
  *G06F 16/48*     (2019.01)
  *G06F 16/41*     (2019.01)

(52) U.S. Cl.
  CPC ............ *G06F 16/489* (2019.01); *G06F 16/41* (2019.01)

(58) Field of Classification Search
  CPC .................... G06F 17/30044; G06F 16/248
  USPC ........................................................ 707/730
  See application file for complete search history.

(56) References Cited

U.S. PATENT DOCUMENTS

| 5,708,825 A | 1/1998 | Sotomayor | |
| 5,969,755 A * | 10/1999 | Courtney | G06F 17/3079 |
| | | | 348/135 |
| 6,819,795 B1 * | 11/2004 | Chiu | G11B 27/28 |
| | | | 382/173 |
| 7,349,477 B2 | 3/2008 | Divakaran et al. | |
| 7,770,116 B2 * | 8/2010 | Zhang | G06F 17/30843 |
| | | | 345/619 |
| 7,890,327 B2 * | 2/2011 | Dorai | H04N 5/783 |
| | | | 704/245 |
| 8,311,330 B2 | 11/2012 | Prabhakara et al. | |
| 8,345,990 B2 * | 1/2013 | Chaudhuri | G06K 9/00751 |
| | | | 382/112 |

(Continued)

OTHER PUBLICATIONS

U.S. Appl. No. 14/798,499, filed Jul. 14, 2015, Methods and Systems for Indexing Multimedia Content, Biswas et al.

(Continued)

*Primary Examiner* — Shahid A Alam
(74) *Attorney, Agent, or Firm* — LeonardPatel PC; Sheetal S. Patel; Michael A. Leonard

(57) ABSTRACT

The disclosed embodiments illustrate methods of generation of a table of content by processing multimedia content. The method includes identifying a set of key-phrases from the multimedia content based on one or more external data sources. The method further includes determining one or more segments of the multimedia content, based on the identified set of key-phrases, wherein a segment of the determined one or more segments comprises a subset of key-phrases from the set of key-phrases. The method further includes selecting at least a key-phrase from the subset of key-phrases of each of the corresponding one or more segments. The method further includes generating the table of content based on the selected key-phrase from each of the one or more segments, wherein the selected key-phrase from each of the one or more segments in the generated table of content is utilized to navigate through the multimedia content.

15 Claims, 5 Drawing Sheets

(56) References Cited

U.S. PATENT DOCUMENTS

| | | | |
|---|---|---|---|
| 8,359,550 B2 | 1/2013 | Meyer et al. | |
| 8,392,183 B2* | 3/2013 | Weber | G11B 27/28 707/738 |
| 8,612,211 B1* | 12/2013 | Shires | G06F 17/27 704/9 |
| 8,670,978 B2 | 3/2014 | Nagatomo | |
| 8,687,941 B2* | 4/2014 | Dirik | G06F 16/739 386/240 |
| 2007/0088844 A1* | 4/2007 | Seims | H04L 29/06027 709/231 |
| 2007/0124678 A1* | 5/2007 | Agnihotri | G06F 16/739 715/720 |
| 2008/0066136 A1 | 3/2008 | Dorai et al. | |
| 2010/0121973 A1 | 5/2010 | Lobacheva et al. | |
| 2010/0274667 A1* | 10/2010 | Lanham | G06F 17/30026 705/14.49 |
| 2012/0011109 A1* | 1/2012 | Ambwani | G06F 17/30029 707/722 |
| 2013/0036124 A1* | 2/2013 | Ambwani | G06F 16/7844 707/749 |
| 2013/0183022 A1* | 7/2013 | Suzuki | G06K 9/00718 386/241 |
| 2014/0173663 A1* | 6/2014 | Boss | H04N 21/4821 725/45 |
| 2016/0118060 A1 | 4/2016 | Yadav et al. | |
| 2017/0063954 A1* | 3/2017 | Biswas | H04L 65/602 |

OTHER PUBLICATIONS

U.S. Appl. No. 15/131,085, filed Apr. 18, 2016, Method and System for Summarizing Multimedia Content, Biswas et al.

U.S. Appl. No. 15/051,718, filed Feb. 24, 2016, Methods and Systems for Extracting Content Items From Content, Biswas et al.

U.S. Appl. No. 15/015,179, filed Feb. 4, 20216, Methods and Systems for Detecting Topic Transitions in a Multimedia Content, Gandhi et al.

U.S. Appl. No. 14/841,760, filed Sep. 1, 2015, Methods and Systems for Segmenting Multimedia Content, Biswas et al.

R. Mihalcea and P. Tarau. Textrank: Bringing order into text. In EMNLP, pp. 404-411. ACL, 2004.

\* cited by examiner

METHOD AND SYSTEM FOR GENERATION OF A TABLE OF CONTENT BY PROCESSING MULTIMEDIA CONTENT

TECHNICAL FIELD

The presently disclosed embodiments are related, in general, to multimedia content processing. More particularly, the presently disclosed embodiments are related to methods and systems for generation of a table of content by processing multimedia content.

BACKGROUND

Advancements in the field of online education have led to the emergence of Massive Open Online Courses (MOOCs) as one of the popular modes of learning. Educational organizations provide various types of educational multimedia content, such as video lectures and/or audio lectures, to students for learning purposes. Such multimedia content may include one or more topics, discussed over the playback duration of the multimedia content.

Usually, the playback duration of such educational multimedia content is longer than that of non-educational multimedia content. In certain scenarios, a student may be interested in a specific topic discussed in the multimedia content. To identify the portion of the multimedia content that is associated with the specific topic, the student may have to navigate back and forth within the multimedia content. In such scenarios, a table of content displayed at the beginning of the multimedia content may be very useful. However, the creation of the table of content manually by segmenting the multimedia content into chunks of similar topics and subsequently indexing them is a very time-consuming and arduous task. Thus, an efficient mechanism to automatically create the table of content for the multimedia content is required.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for generation of a table of content by processing multimedia content in a computing device. The method includes identifying, by one or more processors in the computing device, a set of key-phrases from the multimedia content based on one or more external data sources, wherein the multimedia content is selected based on a request received from a user-computing device associated with a user. The method further includes determining, by the one or more processors in the computing device, one or more segments of the multimedia content, based on the identified set of key-phrases, wherein a segment of the determined one or more segments comprises a subset of key-phrases from the set of key-phrases. The method further includes selecting, by the one or more processors in the computing device, at least a key-phrase from the subset of key-phrases of each of the corresponding one or more segments by utilizing a sequence of topics in a directed graph, wherein the directed graph is determined based on the one or more external data sources. The method further includes generating, by the one or more processors in the computing device, the table of content based on the selected key-phrase from each of the one or more segments, wherein the selected key-phrase from each of the one or more segments in the generated table of content is temporally sequenced and utilized to navigate through the multimedia content, wherein the generated table of content is presented to the user through a user-interface.

According to embodiments illustrated herein, there is provided a system for generation of a table of content by processing multimedia content in a computing device. The system includes one or more processors configured to identify a set of key-phrases from the multimedia content based on one or more external data sources, wherein the multimedia content is selected based on a request received from a user-computing device associated with a user. The one or more processors are further configured to determine one or more segments of the multimedia content, based on the identified set of key-phrases, wherein a segment of the determined one or more segments comprises a subset of key-phrases from the set of key-phrases. The one or more processors are further configured to select at least a key-phrase from the subset of key-phrases of each of the corresponding one or more segments by utilizing a sequence of topics in a directed graph, wherein the directed graph is determined based on the one or more external data sources. The one or more processors are further configured to generate the table of content based on the selected key-phrase from each of the one or more segments, wherein the selected key-phrase from each of the one or more segments in the generated table of content is temporally sequenced and utilized to navigate through the multimedia content, wherein the generated table of content is presented to the user through a user-interface.

According to embodiments illustrated herein, there is provided a computer program product for use with a computing device. The computer program product comprises a non-transitory computer readable medium storing a computer program code for generation of a table of content by processing multimedia content. The computer program code is executable by one or more processors in the computing device to identify a set of key-phrases from the multimedia content based on one or more external data sources, wherein the multimedia content is selected based on a request received from a user-computing device associated with a user. The computer program code is further executable by the one or more processors to determine one or more segments of the multimedia content, based on the identified set of key-phrases, wherein a segment of the determined one or more segments comprise a subset of key-phrases from the set of key-phrases. The computer program code is further executable by the one or more processors to select at least a key-phrase from the subset of key-phrases of each of the corresponding one or more segments by utilizing a sequence of topics in a directed graph, wherein the directed graph is determined based on the one or more external data sources. The computer program code is further executable by the one or more processors to generate the table of content based on the selected key-phrase from each of the one or more segments, wherein the selected key-phrase from each of the one or more segments in the generated table of content is temporally sequenced and utilized to navigate through the multimedia content, wherein the generated table of content is presented to the user through a user-interface.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
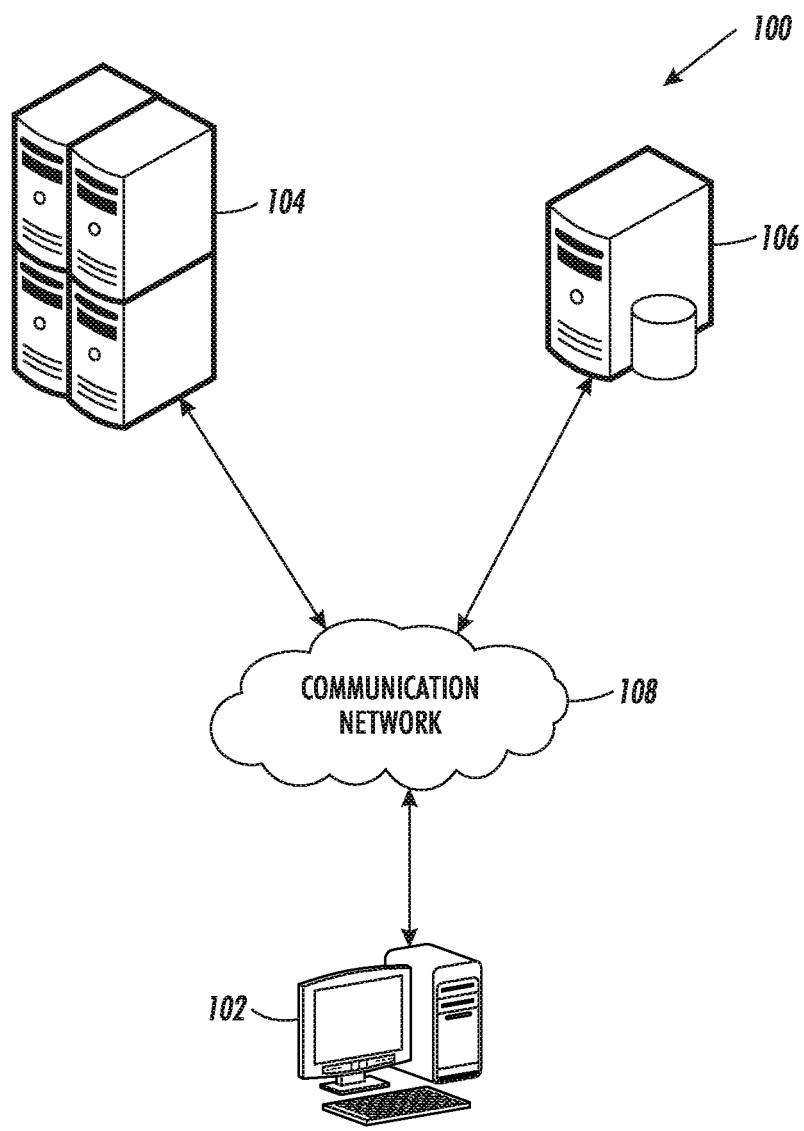
FIG. 1 is a block diagram that illustrates a system environment, in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "user-computing device" refers to a computer, a device (that includes one or more processors/microcontrollers and/or any other electronic components), or a system (that performs one or more operations according to one or more programming instructions/codes) associated with a user. In an embodiment, the user may utilize the user-computing device to transmit one or more requests. Examples of the user-computing device may include, but are not limited to, a desktop computer, a laptop, a personal digital assistant (PDA), a mobile device, a smartphone, and a tablet computer (e.g., iPad® and Samsung Galaxy Tab®).

"Multimedia content" refers to content that uses a combination of different content forms, such as text content, audio content, image content, animation content, video content, and/or interactive content. In an embodiment, the multimedia content may be a combination of a plurality of frames. In an embodiment, the multimedia content may be reproduced on a user-computing device through an application, such as a media player (e.g., Windows Media Player®, Adobe® Flash Player, Microsoft Office®, Apple® QuickTime®, and the like). In an embodiment, the multimedia content may be downloaded from a server to the user-computing device. In an alternate embodiment, the multimedia content may be retrieved from a media storage device, such as hard Disk Drive, CD Drive, pen Drive, and the like, connected to (or inbuilt within) the user-computing device.

"One or more external data sources" refer to one or more knowledge resources, such as Wikipedia®, textbooks, Wordnet, and/or the like, available on one or more websites. In an embodiment, the one or more external data sources may comprise a plurality of topics, described in a sequential order. In an embodiment, the one or more external data sources may be utilized to create a temporally sequential table of content of multimedia content.

A "plurality of keywords" corresponds to words that may be displayed during the playback of multimedia content. In an embodiment, the plurality of keywords may comprise keywords present in text content of the multimedia content. For example, in the text content "Newton's Laws of Motion," the keywords "Newton's," "Laws," "of," and "Motion," may correspond to the plurality of keywords. In another embodiment, the plurality of keywords may comprise words uttered in audio content or displayed as subtitles of the multimedia content.

A "visual saliency" corresponds to a visual parameter, associated with each keyword in a plurality of keywords in multimedia content, indicative of a visual importance of each keyword. The determination of the visual saliency for a keyword in the multimedia content may correspond to a determination of one or more aesthetic features associated with the keyword. Examples of the one or more aesthetic features may include bold, letter case, underline, font size, font type, and font color of each keyword in the multimedia content. For example, a bold keyword may be of more importance than an un-bold keyword.

"Textual saliency" corresponds to a textual parameter, associated with each keyword in a plurality of keywords in multimedia content, indicative of a contextual importance of each keyword. In an embodiment, a weighted graph may be generated for the plurality of keywords for the determination of the textual saliency of each keyword in the plurality of keywords.

A "first score" refers to a score of a keyword, in multimedia content, determined based on visual saliency and/or textual saliency associated with the keyword. In an embodiment, a high value of the first score may indicate that the keyword is highly important. For example, a first keyword may have a first score as "0.45" and a second keyword may have the first score as "0.78." In this scenario, the higher value of the first score of the second keyword indicates that the second keyword is of more importance than the first keyword.

A "set of key-phrases" refers to key-phrases determined from multimedia content based on one or more external data sources. Each key-phrase in the set of key-phrases may be associated with a topic of one or more topics in the multimedia content. Further, each key-phrase may comprise a set of keywords from a plurality of keywords in the multimedia content. In an embodiment, each key-phrase in the set of key-phrases may be associated with a timestamp that is indicative of the occurrence of each key-phrase in the multimedia content.

A "second score" refers to a score of a key-phrase, in multimedia content, determined based on a first score of each keyword in the key-phrase. In an embodiment, the second score of a key-phrase may be indicative of an importance of the key-phrase. For example, a first key-phrase may have a higher second score value than the second key-phrase. In the scenario, the first key-phrase may be more important than the second key-phrase.

"One or more segments" refer to segments of multimedia content that are associated with one or more topics of the multimedia content. Each of the one or more segments comprises a subset of key-phrases of the set of key-phrases in the multimedia content. Further, each of the one or more segments may comprise a set of homogenous segments from one or more homogeneous segments of the multimedia content. In an embodiment, the one or more segments of the multimedia content are utilized to generate a table of content for the multimedia content.

"One or more topics" correspond to one or more concepts discussed in multimedia content. In an embodiment, the multimedia content may be segmented into one or more segments based on the one or more topics discussed in the multimedia content. Further, the one or more topics may correspond to a subset of topics of a plurality of topics that appear in one or more external data sources.

"Sequence of topic" refers to a specific order, determined in real-time, in which a plurality of topics appears in one or more external data sources. In an embodiment, a first topic may correspond to a pre-requisite topic to understand a second topic. Thus, the first topic appears before the second topic. This particular order associated with each of the plurality of topics in the one or more external sources corresponds to the sequence of topics in the plurality of external data sources.

A "directed graph" comprises one or more nodes connected to each other by one or more edges. An edge in the one or more edges may be directed from a node in the one or more nodes towards another node in the one or more nodes. Further, each of the one or more nodes in the directed graph represents a topic of a plurality of topics in one or more external data sources. The direction of the edge between two nodes may be dependent on a sequence of topics. For example, if a first topic is a pre-requisite topic for a second topic, then the edge is directed from a node associated with the first topic towards a node associated with the second topic.

FIG. 1 is a block diagram of a system environment in which various embodiments may be implemented. With reference to FIG. 1, there is shown a system environment 100 that includes a user-computing device 102, an application server 104, a database server 106, and a communication network 108. Various devices in the system environment 100 may be interconnected over the communication network 108. FIG. 1 shows, for simplicity, one user-computing device, such as the user-computing device 102, one application server, such as the application server 104, and one database server, such as the database server 106. However, it will be apparent to a person having ordinary skill in the art that the disclosed embodiments may also be implemented using multiple user-computing devices, multiple application servers, and multiple database servers, without departing from the scope of the disclosure.

The user-computing device 102 may refer to a computing device (associated with a user) that may be communicatively coupled to the communication network 108. The user-computing device 102 may include one or more processors and one or more memories. The one or more memories may include a computer readable code that may be executable by the one or more processors to perform one or more operations. In an embodiment, the user-computing device 102 may be utilized by the user to transmit a request for generating a table of content for multimedia content. In an embodiment, the request may comprise the multimedia content for which the table of content is to be generated. In another embodiment, the request may comprise an identification parameter, such as a name and/or a product identifier, of the multimedia content. In an embodiment, the user-computing device 102 may include hardware and/or software that may be configured to display the multimedia content to the user. In an embodiment, the user-computing device 102 may be utilized to display a user-interface, received from the application server 104. The displayed user-interface may present the table of content that may be viewed by the user associated with the user-computing device 102. The user may further select a key-phrase, from one or more key-phrases in the presented table of content, based on which the user may navigate through the multimedia content. The user-computing device 102 may correspond to a variety of computing devices, such as, but not limited to, a laptop, a PDA, a tablet computer, a smartphone, and a phablet.

A person having ordinary skill in the art will understand that the scope of the disclosure is not limited to the utilization of the user-computing device 102 by a single user. In an embodiment, the user-computing device 102 may be utilized by more than one users to transmit the request.

The application server 104 may refer to a computing device or a software framework hosting an application or a software service that may be communicatively coupled to the communication network 108. In an embodiment, the application server 104 may be implemented to execute procedures, such as, but not limited to, programs, routines, or scripts stored in one or more memories for supporting the hosted application or the software service. In an embodiment, the hosted application or the software service may be configured to perform one or more predetermined operations. In an embodiment, the one or more predetermined operations may include automatic generation of the table of content by processing the multimedia content. In an embodiment, the multimedia content may comprise text content and/or audio content. In an embodiment, the application server 104 may be configured to receive the request for the generation of the table of content from the user-computing device 102. Thereafter, the application server 104 may be configured to process the multimedia content for the generation of the table of content. In another embodiment, prior to processing the multimedia content, the application server 104 may be configured to retrieve the multimedia content from the database server 106, based on the identification parameter in the received request.

For processing the multimedia content, in an embodiment, the application server 104 may be configured to identify a plurality of keywords from the multimedia content by utilizing one or more text identification techniques. Examples of the one or more text identification techniques may include, but are not limited to, optical character recognition (OCR) technique and handwriting character recognition (HCR) technique. In an embodiment, the plurality of keywords may be associated with the text content and/or the audio content in the multimedia content. After the identification of the plurality of keywords, the application server 104 may be further configured to determine a first score for each of the identified plurality of keywords. The first score may be determined based on one or both of a visual saliency and a textual saliency associated with each of the plurality of keywords. In an embodiment, the first score may be determined based on the visual saliency when the plurality of keywords is associated with the text content in the multimedia content. In an embodiment, the first score may be determined based on the textual saliency when the plurality of keywords is associated with the audio content in the multimedia content.

In an embodiment, the application server 104 may be further configured to identify a set of key-phrases from the multimedia content. In an embodiment, the application server 104 may utilize one or more external data sources, available on one or more websites, to identify the set of key-phrases. Examples of the one or more external data sources may include, but are not limited to, Wikipedia®, textbooks, and Wordnet. Further, each key-phrase in the set of key-phrases comprises a set of keywords from the plurality of keywords. After the identification of the set of key-phrases, the application server 104 may be configured to determine a second score for each key-phrase in the set of key-phrases. The application server 104 may determine the second score for each key-phrase in the set of key-phrases based on the first score of each keyword in the set of keywords in the corresponding key-phrase. In an embodiment, each key-phrase of the set of key-phrases may be associated with a corresponding timestamp that may indicate a time of occurrence of the key-phrase in the multimedia content.

In an embodiment, the application server 104 may be configured to determine one or more segments of the multimedia content, based on the identified set of key-phrases. In an embodiment, the application server 104 may utilize one or more segmentation techniques known in the art to determine of the one or more segments. Examples of the one or more segmentation techniques may include, but are not limited to, normalized cut segmentation technique, graph cut segmentation technique, and minimum cut segmentation technique. Further, each of the one or more segments may be associated with a topic of one or more topics described in the multimedia content. In an embodiment, a segment of the determined one or more segments may comprise a subset of key-phrases from the set of key-phrases. In an embodiment, the application server 104 may be configured to rank each key-phrase in the subset of key-phrases associated with each of the one or more segments, based on the second score associated with each key-phrase in the subset of key-phrases.

In an embodiment, the application server 104 may be further configured to select at least a key-phrase from the subset of key-phrases of each of the corresponding one or more segments. In an embodiment, the application server 104 may utilize a sequence of topics in a directed graph for the selection of the key-phrase from the subset of key-phrases of each of the corresponding one or more segments. Prior to the selection, the application server 104 may be configured to determine the directed graph based on the one or more external data sources. In an embodiment, the directed graph may comprise one or more nodes. Each of the one or more nodes in directed graph may be associated with a topic among a plurality of topics in the one or more external data sources. In an embodiment, the application server 104 may further select at least the key-phrase from the subset of key-phrases of each of the corresponding one or more segments, based on the second score associated with each of the key-phrase in the corresponding sub-set of key-phrases.

Thereafter, the application server 104 may be configured to generate the table of content based on the selected key-phrase from each of the one or more segments. In an embodiment, the generated table of content comprises temporally sequenced selected key-phrase from each of the one or more segments. Further, the selected key-phrase in the generated table of content may be utilized to navigate through the multimedia content. Thereafter, the application server 104 may be configured to present the generated table of content to the user through the user-interface that may be displayed on a display screen of the user-computing device 102.

The application server 104 may be realized through various types of application servers, such as, but not limited to, a Java application server, a .NET framework application server, a Base4 application server, a PHP framework application server, or any other application server framework. An embodiment of the structure of the application server 104 has been discussed later in FIG. 2.

A person having ordinary skill in the art will appreciate that the scope of the disclosure is not limited to realizing the application server 104 and the user-computing device 102 as separate entities. In an embodiment, the application server 104 may be realized as an application program installed on and/or running on the user-computing device 102, without departing from the scope of the disclosure.

The database server 106 may refer to a computing device that may be communicatively coupled to the communication network 108. In an embodiment, the database server 106 may be configured to store the multimedia content. In an embodiment, the database server 106 may be configured to receive the query, for the retrieval of the multimedia content, from the application server 104. Thereafter, the database server 106 may be configured to transmit the multimedia content to the application server 104 based on the received query. For querying the database server 106, one or more querying languages, such as, but not limited to, SQL, QUEL, and DMX, may be utilized. In an embodiment, the database server 106 may connect to the application server 104, using one or more protocols, such as, but not limited to, the ODBC protocol and the JDBC protocol.

In an embodiment, the database server 106 may be realized through various technologies such as, but not limited to, Microsoft® SQL Server, Oracle®, IBM DB2®, Microsoft Access®, PostgreSQL®, MySQL® and SQLite®.

A person having ordinary skill in the art will appreciate that the scope of the disclosure is not limited to realizing the database server 106 and the application server 104 as separate entities. In an embodiment, the functionalities of the database server 106 can be integrated into the application server 104, without departing from the scope of the disclosure.

The communication network 108 may correspond to a medium through which content and messages flow between various devices, such as the user-computing devices 102, the application server 104, and the database server 106, of the system environment 100 may communicate with each other. Examples of the communication network 110 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the communication network 110 in accordance with various wired and wireless communication protocols such as Transmission Control Protocol and Internet Protocol (TCP/IP), User Datagram Protocol (UDP), and 2G, 3G, or 4G communication protocols.

Figure 2:
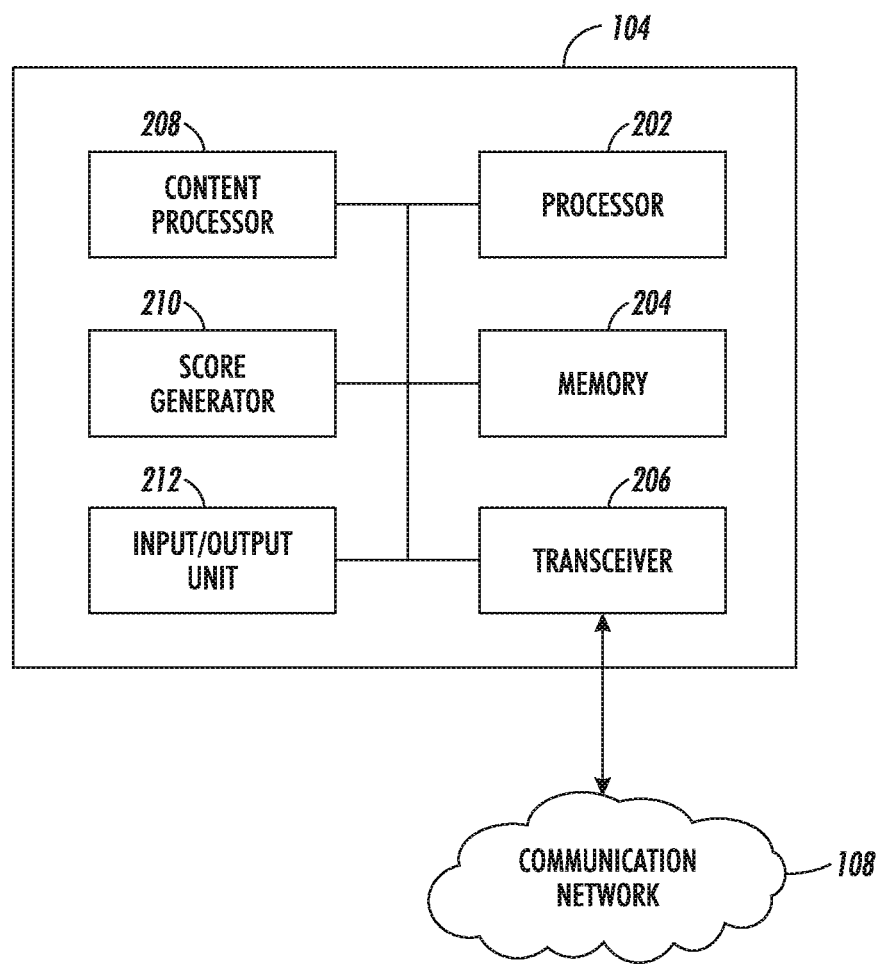
FIG. 2 is a block diagram that illustrates an application server, in accordance with at least one embodiment.

FIG. 2 is a block diagram that illustrates an application server, in accordance with at least one embodiment. FIG. 2 has been described in conjunction with FIG. 1. With reference to FIG. 2, there is shown a block diagram of the application server 104 that may include a processor 202, a memory 204, a transceiver 206, a content processor 208, a score generator 210, and an input/output unit 212. The processor 202 is communicatively coupled to the memory 204, the transceiver 206, the content processor 208, the score generator 210, and the input/output unit 212.

The processor 202 includes suitable logic, circuitry, and/or interfaces that are configured to execute one or more instructions stored in the memory 204. The processor 202 may further comprise an arithmetic logic unit (ALU) (not shown) and a control unit (not shown). The ALU may be coupled to the control unit. The ALU may be configured to perform one or more mathematical and logical operations and the control unit may control the operation of the ALU. The processor 202 may execute a set of instructions/programs/codes/scripts stored in the memory 204 to perform one or more operations for the generation of the table of content for the multimedia content. Examples of the one or more operations may include the determination of the one or more segments of the multimedia content, and the selection of at least the key-phrase from each of the one or more segments. The processor 202 may be implemented based on a number of processor technologies known in the art. Examples of the processor 202 may include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store the one or more sets of instructions that are executable by the processor 202, the transceiver 206, the content processor 208, the score generator 210, and the input/output unit 212. In an embodiment, the memory 204 may include one or more buffers (not shown). The one or more buffers may store the plurality of keywords, the first scores, the set of key-phrases, the second scores, and the one or more segments. Examples of some of the commonly known memory implementations may include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform specific operations. It will be apparent to a person having ordinary skill in the art that the one or more instructions stored in the memory 204 may enable the hardware of the application server 104 to perform the one or more predetermined operations, without deviating from the scope of the disclosure.

The transceiver 206 transmits/receives messages and data to/from various components, such as the user-computing device 102 and the database server 106 of the system environment 100, over the communication network 108. In an embodiment, the transceiver 206 may be communicatively coupled to the communication network 108. In an embodiment, the transceiver 206 may be configured to receive the request from the user-computing device 102. In an embodiment, the transceiver 206 may be configured to receive the multimedia content from the database server 106. Further, the transceiver 206 may be configured to transmit the user interface, comprising the generated table of content, to the user-computing device 102, through which the user may navigate through the multimedia content. Examples of the transceiver 206 may include, but are not limited to, an antenna, an Ethernet port, a USB port, or any other port configured to receive and transmit data. The transceiver 206 transmits/receives the messages and data, in accordance with the various communication protocols, such as TCP/IP, UDP, and 2G, 3G, or 4G communication protocols.

The content processor 208 includes suitable logic, circuitry, and/or interfaces that are configured to execute the one or more sets of instructions stored in the memory 204. In an embodiment, the content processor 208 may be configured to identify the plurality of keywords from the multimedia content and identify the set of key-phrases from the multimedia content. The content processor 208 may utilize the one or more text identification techniques, such as OCR technique and HCR technique, known in the art for the identification of the plurality of keywords and the set of key-phrases. In an embodiment, the content processor 208 may be further configured to determine the visual saliency and the textual saliency associated with each of the plurality of keywords. The content processor 208 may be implemented based on a number of processor technologies known in the art. Examples of the content processor 208 may include, but are not limited to, a word processor, an X86-based processor, a RISC processor, an ASIC processor, and/or a CISC processor.

A person having ordinary skill in the art will appreciate that the scope of the disclosure is not limited to realizing the content processor 208 and the processor 202 as separate entities. In an embodiment, the content processor 208 may be implemented within the processor 202, without departing from the spirit of the disclosure. Further, a person skilled in the art will understand that the scope of the disclosure is not limited to realizing the content processor 208 as a hardware component. In an embodiment, the content processor 208 may be implemented as a software module included in computer program code (stored in the memory 204), which may be executable by the processor 202 to perform the functionalities of the content processor 208.

The score generator 210 includes suitable logic, circuitry, and/or interfaces that are configured to execute the one or more sets of instructions stored in the memory 204. In an embodiment, the score generator 210 may be configured to determine the first score for each of the plurality of keywords and the second score for each of the set of key-phrases. In an embodiment, the score generator 210 may be further configured to rank each key-phrase in the subset of key-phrases associated with each of the one or more segments. The score generator 210 may be implemented based on a number of processor technologies known in the art. Examples of the score generator 210 may include, but are not limited to, a word processor, an X86-based processor, a RISC processor, an ASIC processor, and/or a CISC processor.

A person having ordinary skill in the art will appreciate that the scope of the disclosure is not limited to realizing the score generator 210 and the processor 202 as separate entities. In an embodiment, the score generator 210 may be implemented within the processor 202, without departing from the spirit of the disclosure. Further, a person skilled in the art will understand that the scope of the disclosure is not limited to realizing the score generator 210 as a hardware component. In an embodiment, the score generator 210 may be implemented as a software module included in computer program code (stored in the memory 204), which may be executable by the processor 202 to perform the functionalities of the score generator 210.

The input/output unit 212 may comprise suitable logic, circuitry, interfaces, and/or code that may be configured to provide an output to the user and/or the service provider. The input/output unit 212 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker. The working of the application server 104 for the generation of the table of content by processing the multimedia content has been explained later in FIG. 3.

Figure 3:
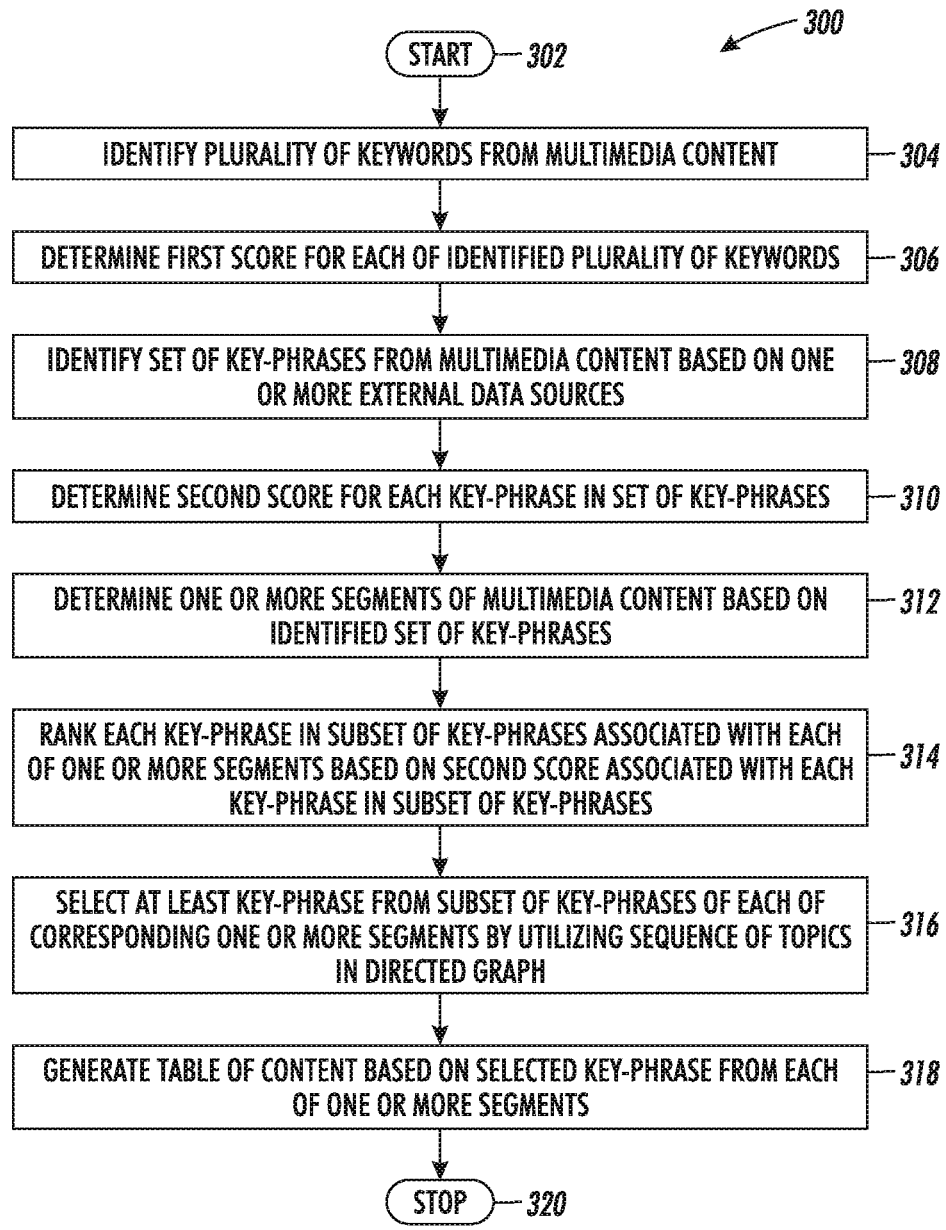
FIG. 3 is a flowchart that illustrates a method for generation of a table of content by processing multimedia content, in accordance with at least one embodiment.

FIG. 3 depicts a flowchart that illustrates a method of generation of a table of content by processing multimedia content, in accordance with at least one embodiment. FIG. 3 is described in conjunction with FIG. 1 and FIG. 2. With reference to FIG. 3, there is shown a flowchart 300 that illustrates a method of generation of the table of content by processing the multimedia content. A person having ordinary skill in the art will understand that the examples, as described in FIG. 3, are for illustrative purpose and should not be construed to limit the scope of the disclosure. The method starts at step 302 and proceeds to step 304.

At step 304, the plurality of keywords is identified from the multimedia content. In an embodiment, the content processor 208, in conjunction with the processor 202, may be configured to identify the plurality of keywords from the multimedia content. In an embodiment, the content processor 208 may utilize the one or more text identification techniques for the identification of the plurality of keywords from the multimedia content. In an embodiment, the content processor 208 may be configured to identify the plurality of keywords from the text content and/or the audio content of the multimedia content.

Prior to the identification of the plurality of keywords, the transceiver 206 may receive the request for the generation of the table of content from the user, associated with the user-computing device 102. In an embodiment, the request may comprise the multimedia content that may be processed for the generation of the table of content.

A person having ordinary skill in the art will understand that the scope of the disclosure is not limited to the request comprising the multimedia content. In another embodiment, the request may comprise the identification parameter of the multimedia content which may be utilized by the transceiver 206 for the retrieval of the multimedia content from the database server 106.

After the reception/retrieval of the multimedia content, the processor 202 may process the multimedia content. In an embodiment, the multimedia content may comprise the text content and/or the audio content. The text content may comprise one or more first keywords that may be displayed during the playback of the multimedia content. In an embodiment, the one or more first keywords are associated with the visual saliency. The audio content may further comprise one or more second keywords that may be uttered by a speaker in the multimedia content. In an embodiment, the one or more second keywords are associated with the textual saliency.

For identifying the one or more first keywords from the text content, the content processor 208 may utilize the one or more text identification techniques. Examples of the one or more text identification techniques may include, but are not limited to, OCR technique and HCR technique. Further, for the identification of the one or more second keywords from the audio content, the content processor 208 may be configured to convert the audio content of the multimedia content into text format by utilizing one or more speech processing techniques, such as Automatic Speech Recognition (ASR) technique. Thereafter, the content processor 208 may identify the one or more second keywords from the text format of the audio content. The identified one or more first keywords and the identified one or more second keywords are collectively referred to as the plurality of keywords.

A person having ordinary skill in the art will understand that the scope of the disclosure is not limited to the identification of the one or more second keywords from the audio content by utilizing the speech processing techniques. In an alternate embodiment, the one or more second keywords may be identified from a subtitle file of the audio content in the multimedia content.

At step 306, the first score is determined for each of the identified plurality of keywords. In an embodiment, the score generator 210, in conjunction with the processor 202, may be configured to, determine the first score for each of the identified plurality of keywords. In an embodiment, the score generator 210 may determine the first score for each of the one or more first keywords in the plurality of keywords based on the visual saliency. Further, the score generator 210 may determine the first score for each of the one or more second keywords in the plurality of keywords based on the textual saliency.

For the determination of the first score for each of the one or more first keywords, the content processor 208 may determine the visual saliency associated with each of the one or more first keywords. In an embodiment, the visual saliency may be indicative of a visual importance of a keyword. The determination of visual saliency may include the determination of one or more aesthetic features associated with each of the one or more first keywords. Examples of the one or more aesthetic features may include bold, letter case, underline, font size, font type, and font color of each first keyword in the multimedia content. Further, each of the one or more aesthetic features may be associated with a first weight. Thereafter, based on the first weight of each of the one or more aesthetic features, the score generator 210 may determine the first score for each of the one or more first keywords.

For example, a first aesthetic feature, such as bold, may have the first weight "0.64" and a second aesthetic feature, such as underline, may have the first weight "0.36." Further, the content processor 208 may determine the one or more aesthetic features, such as bold and underline, for each of the one or more first keywords in the text content. In an instance, the content processor 208 may determine a keyword, such as "Newton's," in the one or more first keywords that is bold and underlined and another keyword, such as "inertia," in the one or more first keywords that is bold but not underlined. In such a case, the score generator 210 may determine a first score, such as "1," for the keyword "Newton's" and a first score, such as "0.64," for the other keyword "inertia", based on the first weights of the one or more aesthetic features.

A person having ordinary skill in the art will understand that the abovementioned example is for illustrative purpose and should not be construed to limit the scope of the disclosure.

For the determination of the first score for each of the one or more second keywords, the content processor 208 may determine the textual saliency associated with each of the one or more second keywords. The textual saliency of a second keyword may be indicative of the contextual importance of the second keyword. For the determination of the textual saliency, the score generator 210 may be configured to generate a first weighted graph "$W_1$" for the one or more second keywords, by utilizing one or more graph generation algorithms, such as Textrank algorithm, known in the art. In an embodiment, the one or more second keywords in the first weighted graph "$W_1$" may be represented as one or more vertices of the first weighted graph "$W_1$." Further, the one or more vertices may be connected to each other with edges. Each edge in the first weighted graph "$W_1$" may be associated with an edge weight "$E_{w1}$." Further, the edge weight "$E_{w1}$" between any two vertices of the first weighted graph may correspond to a count of times the second keywords, associated with the two vertices, co-occur in the text format/subtitle file of the audio content.

Thereafter, the score generator 210 may utilize the generated first weighted graph for the determination of the first score for each of the one or more second keywords. In an embodiment, the score generator 210 may utilize one or more algorithms, such as Pagerank algorithm, known in the art to determine of the first score.

At step 308, the set of key-phrases is identified from the multimedia content based on the one or more external data sources. In an embodiment, the content processor 208, in conjunction with the processor 202, may be configured to identify the set of key-phrases from the multimedia content. The content processor 208 may utilize the one or more external data sources available on one or more online websites for the identification of the set of key-phrases from the multimedia content.

Prior to the identification of the set of key-phrases, the content processor 208 may be configured to determine a plurality of key-phrases from the one or more external data sources available on the one or more online websites. Examples of the one or more external data sources may include, but are not limited to, Wikipedia®, textbooks, and Wordnet. In an embodiment, each key-phrase in the plurality of key-phrases may be indicative of a topic among a plurality of topics in the one or more external data sources. In an embodiment, the content processor 208 may determine the plurality of key-phrases based on a count of occurrences of a key-phrase in the one or more external data sources. For example, a key-phrase, such as "Newton's laws of motion," is more likely to be determined as a key-phrase in the plurality of key-phrases than another key-phrase, such as "I like mangoes."

Further, in an embodiment, the content processor 208 may identify one or more key-phrases from the multimedia content (i.e., the text content and the text format/subtitle file of the audio content) by utilizing the one or more text identification techniques known in the art. Examples of the one or more text identification techniques may include, but are not limited to, OCR technique and HCR technique. Thereafter, the content processor 208 may identify the set of key-phrases from the multimedia content by utilizing the determined plurality of key-phrases and the identified one or more key-phrases. In an embodiment, the content processor 208 may compare the one or more key-phrases with the plurality of key-phrases. Based on the comparison, the content processor 208 may identify the key-phrases among the plurality of key-phrases and the one or more key-phrases that are common. Further, the identified common key-phrases may correspond to the set of key-phrases. Table 1 illustrates a comparison between a plurality of key-phrases and one or more key-phrases.

TABLE 1

Illustration of a comparison between a plurality of key-phrases and one or more key-phrases

| Plurality of key-phrases | One or more key-phrases | Comparison result |
|---|---|---|
| statistical time division multiplexing | multiple signal, total bandwidth | No |
| Archimedes principle | kind encryption | No |
| packet switching network | packet switching network | Yes |
| local area network | address domain | No |
| Newton's laws of motion | Newton's laws of motion | Yes |

With reference to Table 1, the content processor 208 may identify the key-phrases, such as "packet switching network" and "Newton's laws of motion," as the set of key-phrases from the multimedia content.

A person having ordinary skill in the art will understand that the abovementioned table is for illustrative purpose and should not be construed to limit the scope of the disclosure.

In an embodiment, the content processor 208 may be further configured to determine a timestamp for each key-phrase in the set of key-phrases. In an embodiment, the timestamp of the key-phrase may be indicative of the occurrence of the key-phrase in the multimedia content. For example, a timestamp, such as "00:10:00," for a key-phrase, such as "Newton's laws of motion," may indicate that the key-phrase occurs when "ten minutes" of the multimedia content has elapsed.

Further, each key-phrase in the set of key-phrases comprises a corresponding set of keywords from the plurality of keywords. For example, a key-phrase, such as "Newton's laws of motion," may comprise a set of keywords, such as "Newton's," "laws," "of," and "motion," among the plurality of keywords.

A person having ordinary skill in the art will understand that the abovementioned example is for illustrative purpose and should not be construed to limit the scope of the disclosure.

At step 310, the second score is determined for each key-phrase in the set of key-phrases. In an embodiment, the score generator 210, in conjunction with the processor 202, may be configured to determine the second score for each key-phrase in the set of key-phrases. In an embodiment, the score generator 210 may utilize the first score of each keyword in the set of keywords in the corresponding key-phrase for the determination of the second score. For example, the second score of a key-phrase, such as "Newton's laws of motion," may be equal to a sum of the first score of each keyword in the set of keywords (i.e., "Newton's," "laws," "of," and "motion") in the key-phrase.

A person having ordinary skill in the art will understand that the abovementioned example is for illustrative purpose and should not be construed to limit the scope of the disclosure.

At step 312, the one or more segments of the multimedia content are determined based on the identified set of key-phrases. In an embodiment, the processor 202 may be configured to determine the one or more segments of the multimedia content based on the identified set of key-phrases. Prior to the determination of the one or more segments, the processor 202 may be configured to segment the multimedia content into one or more homogenous segments of a pre-determined duration. For example, the processor 202 may segment the multimedia content into "twenty" homogeneous segments of duration "30 seconds" each. Further, each homogeneous segment in the determined one or more homogeneous segments comprises a first subset of key-phrases from the set of key-phrases. For example, Table 2 illustrates the one or more homogenous segments, the corresponding time durations, and the corresponding first subset of key-phrases.

TABLE 2

Illustration of the one or more homogenous segments, the corresponding time durations, and the corresponding first subset of key-phrases

| One or more homogeneous segments | Time duration (HH:MM:SS) | First subset of key-phrases |
|---|---|---|
| $HS_1$ | 00:00:00-00:00:30 | $KP_1$, $KP_2$, $KP_3$, $KP_5$, and $KP_7$ |
| $HS_2$ | 00:00:31-00:01:00 | $KP_1$, $KP_6$, $KP_{10}$, $KP_{11}$, and $KP_7$ |
| $HS_3$ | 00:01:01-00:01:30 | $KP_1$, $KP_4$, $KP_9$, $KP_{12}$, and $KP_{11}$ |
| $HS_4$ | 00:01:31-00:02:00 | $KP_3$, $KP_4$, $KP_{15}$, $KP_{12}$, and $KP_{14}$ |
| $HS_5$ | 00:02:01-00:02:30 | $KP_9$, $KP_3$, $KP_{11}$, $KP_{10}$, and $KP_1$ |
| $HS_6$ | 00:02:31-00:03:00 | $KP_5$, $KP_{12}$, $KP_{13}$, $KP_7$, and $KP_2$ |
| $HS_7$ | 00:03:01-00:03:30 | $KP_{11}$, $KP_9$, and $KP_3$ |

A person having ordinary skill in the art will understand that the abovementioned table is for illustrative purpose and the scope of the predetermined duration is not limited to being equal to "30 seconds." In an embodiment, the predetermined duration may be specified by the user in the request.

Thereafter, the content processor 208 may be configured to generate a second weighted graph "$W_2$" for the one or more homogeneous segments by utilizing the one or more graph generation algorithms. In an embodiment, the one or more homogeneous segments in the second weighted graph "$W_2$" may be represented as one or more vertices of the second weighted graph "$W_2$." Further, a vertex, associated with a homogenous segment, in the second weighted graph "$W_2$" may be connected to a maximum of a predetermined count (e.g., "5") of vertices that are associated with the homogenous segments temporally subsequent to the homogenous segment. For example, Table 3 illustrates the one or more homogenous segments, the corresponding time durations, and information pertaining to the connected subsequent homogenous segments.

TABLE 3

Illustration of the one or more homogenous segments, the corresponding time durations and information pertaining to interconnected subsequent homogenous segments

| One or more homogeneous segments | Time duration (MM:SS) | Connected subsequent homogenous segments |
|---|---|---|
| $HS_1$ | 00:00:00-00:00:30 | $HS_2$, $HS_3$, $HS_4$, $HS_5$, and $HS_6$ |
| $HS_2$ | 00:00:31-00:01:00 | $HS_3$, $HS_4$, $HS_5$, $HS_6$, and $HS_7$ |
| $HS_3$ | 00:01:01-00:01:30 | $HS_4$, $HS_5$, $HS_6$, and $HS_7$ |
| $HS_4$ | 00:01:31-00:02:00 | $HS_5$, $HS_6$, and $HS_7$ |
| $HS_5$ | 00:02:01-00:02:30 | $HS_6$ and $HS_7$ |
| $HS_6$ | 00:02:31-00:03:00 | $HS_7$ |
| $HS_7$ | 00:03:01-00:03:30 | — |

With reference to Table 3, a vertex of a homogenous segment, such as "$HS_1$," may be connected to the vertices of five temporally subsequent homogenous segments, such as "$HS_2$," "$HS_3$," "$HS_4$," "$HS_5$," and "$HS_6$."

A person having ordinary skill in the art will understand that the abovementioned table is for illustrative purpose and should not be construed to limit the scope of the disclosure.

In an embodiment, the content processor 208 may be configured to determine a weight "$E_{w2}$" of an edge between any two connected vertices in the second weighted graph. In an embodiment, the weight "$E_{w2}$" of the edge may be determined based on the second scores of the key-phrases in the first subset of key-phrases of each of the two homogeneous segments associated with the connected vertices. In an embodiment, the content processor 208 may determine common key-phrases in the first subset of key-phrases of the homogeneous segments associated with the connected vertices. Thereafter, the content processor 208 may be configured to determine a sum of the second scores associated with the common key-phrases. Further, the content processor 208 may determine dissimilar key-phrases among the first subset of key-phrases of the homogeneous segments associated with the connected vertices. Thereafter, the content processor 208 may be configured to determine a sum of the second scores of the dissimilar key-phrases. Thereafter, the content processor 208 may determine a difference between the sum of the second scores of the common key-phrases and the sum of the second scores of the dissimilar key-phrases, such that the difference corresponds to the weight "$E_{w2}$" of the edge between the two connected vertices.

For example, with reference to Table 2 and Table 3, the content processor 208 may be configured to determine a weight for the edge between two vertices associated with the homogenous segments "$HS_1$" and "$HS_2$." The content processor 208 may determine the sum, such as "$FS_1$," of the second scores of the common key-phrases, such as "$KP_1$" and "$KP_7$." Further, the content processor 208 may determine the sum, such as "$FS_2$," of the second scores of the dissimilar key-phrases, such as "$KP_2$," "$KP_3$," "$KP_5$," "$KP_6$," "$KP_{10}$," and "$KP_{11}$." Thereafter, the content processor 208 may determine the difference, such as "D," between the sum "$FS_1$" and the sum "$FS_2$," such that difference "D" corresponds to the weight "$E_{w2}$" of the edge between the connected vertices associated with the homogenous segments "$HS_1$" and "$HS_2$."

A person having ordinary skill in the art will understand that the abovementioned example is for illustrative purpose and should not be construed to limit the scope of the disclosure.

Further, in an embodiment, the content processor 208 may determine the one or more segments of the multimedia content from the generated second weighted graph. In an embodiment, the content processor 208 may utilize the one or more segmentation techniques, known in the art, on the generated second weighted graph for the determination of the one or more segments. Examples of the one or more segmentation techniques may include, but are not limited to, normalized cut segmentation technique, graph cut segmentation technique, and minimum cut segmentation technique. In an embodiment, each of the identified one or more segments may be associated with a topic among the one or more topics described in the multimedia content.

For example, based on the one or more segmentation techniques, the content processor 208 may determine the one or more segments, such as "$S_1$," "$S_2$," and "$S_3$." Further, each of the one or more segments comprises a set of the homogenous segments from the one or more homogenous segments. For example, with reference to Table 2 and Table 3, segment "$S_1$" comprises the set of homogeneous segments, such as "$HS_1$" and "$HS_2$," segment "$S_2$" comprises the set of homogeneous segments, such as "$HS_3$" and "$HS_4$," and segment "$S_3$" comprises the set of homogeneous segments, such as "$HS_5$," "$HS_6$," and "$HS_7$." Furthermore, each of the one or more segments comprises a second subset of key-phrases from the set of key-phrases, such that the second subset of key-phrases for a segment includes the first subset of key-phrases of the corresponding homogeneous segments. For example, with reference to Table 2, a segment, such as "$S_1$," comprises a second subset of key-phrases that includes the first subset of key-phrases, such as "$KP_1$," "$KP_2$," "$KP_3$," "$KP_5$," "$KP_6$," "$KP_7$," "$KP_{10}$," and "$KP_{11}$," of the corresponding homogeneous segments, such as "$HS_1$" and "$HS_2$."

A person having ordinary skill in the art will understand that the abovementioned examples are for illustrative purpose and should not be construed to limit the scope of the disclosure. Hereinafter, the terms, such as "the subset of key-phrases" and "the second subset of key-phrases" have been used interchangeably, without deviating from the scope of the disclosure.

In an embodiment, the count of the one or more segments may be specified in the request by the user. Thereafter, the content processor 208 may determine the one or more segments from the generated second weighted graph of the multimedia content based on the specified count. For example, with reference to Table 2, if the specified count of the one or more segments is "two," the content processor 208 may determine two segments, such as "$S_1$" and "$S_2$." Further, segment "$S_1$" may comprise the homogeneous segments, such as "$HS_1$," "$HS_2$," and "$HS_3$" and segment "$S_2$" may comprise the homogeneous segments, such as "$HS_4$," "$HS_5$," "$HS_6$," and "$HS_7$."

A person having ordinary skill in the art will understand that the abovementioned example is for illustrative purpose and should not be construed to limit the scope of the disclosure.

At step 314, each key-phrase in the second subset of key-phrases, associated with each of the one or more segments, is ranked based on the second score associated with each key-phrase in the second subset of key-phrases. In an embodiment, the score generator 210, in conjunction with the processor 202, may be configured to rank each key-phrase in the second subset of key-phrases associated with each of the one or more segments, based on the second score associated with each key-phrase in the second subset of key-phrases.

In another embodiment, the score generator 210 may rank each key-phrase in a second subset of key-phrases associated with a segment, based on the topic associated with the segment. The score generator 210 may utilize one or more ranking techniques, such as a KL divergence technique, known in the art to rank each key-phrase in the second subset of key-phrases associated with the segment. For example, score generator 210 may determine a divergence, such as KL divergence, between the distribution of each key-phrase, such as "$KP_1$," "$KP_2$," "$KP_3$," "$KP_5$," "$KP_6$," "$KP_7$," "$KP_{10}$," and "$KP_{11}$," in the second subset of key-phrases associated with a segment, such as "$S_1$" and a uniform distribution across the multimedia content. Further, based on the divergence the score generator 210 may rank each key-phrase in the second subset of key-phrases associated with the segment "$S_1$."

A person having ordinary skill in the art will understand that the abovementioned example is for illustrative purpose and should not be construed to limit the scope of the disclosure.

At step 316, at least a key-phrase from the second subset of key-phrases of each of the corresponding one or more segments is selected by utilizing the sequence of topics in the directed graph. In an embodiment, the processor 202 may be configured to select at least a key-phrase from the second subset of key-phrases of each of the corresponding one or more segments by utilizing the sequence of topics in the directed graph. Prior to the selection of the key-phrase from the second subset of key-phrases of each of the corresponding one or more segments, the processor 202 may be configured to generate the directed graph based on the one or more external data sources.

In an embodiment, the directed graph may comprise one or more nodes. In an embodiment, each of the one or more nodes may be associated with a topic among the plurality of topics in the one or more external data sources. Further, a node in the directed graph may be connected with another node in the directed graph by a directed edge. In an embodiment, the directed edge from a first node to a second node may indicate that the topic associated with the first node may be a pre-requisite topic to understand the topic associated with the second node. In an embodiment, the direction of each edge in the directed graph may be indicative of the sequence of topics in the directed graph. For example, to understand a topic related to "Newton's laws of motion," topics, such as "force," "motion," inertia," and/or the like, may be pre-requisite topics.

In an exemplary scenario, the content processor 208 may generate the directed graph based on an external data source, such as Wikipedia®. The content processor 208 may determine one or more seed topics for a topic in the plurality of topics in Wikipedia®. Further, the one or more seed topics may be utilized to identify the pre-requisite topics for the topic. Thereafter, the content processor 208 may built a directed edge between the one or more nodes associated with the one or more seed topics and the node associated with the topic. The content processor 208 may utilize syntactic information in the one or more seed topics to determine the direction of the edge between the one or more nodes associated with the one or more seed topics and the node associated with the topic.

A person having ordinary skill in the art will understand that the scope of the disclosure is not limited to the use of Wikipedia® as an external data source. In another embodiment, the content processor 208 may utilize a play-list of multimedia content, course information available on one or more online websites, and/or the like for the generation of the directed graph.

After the generation of the directed graph, the processor 202 may select at least a key-phrase from the second subset of key-phrases of each of the corresponding one or more segments by utilizing the sequence of topics in the directed graph. Prior to the selection of the key-phrase, the processor 202 may be configured to identify a directed sub-graph from directed graph, such that the one or more nodes in the directed sub-graph are associated with the one or more topics of the one or more segments of the multimedia content. The processor 202 may further utilize the second score associated with each key-phrase in the second subset of key-phrases of each of the corresponding one or more segments for the selection of the at least a key-phrase. Further, the processor 202 may utilize the sequence of topics in the directed sub-graph to determine the compatibility score of each key-phrase in the second subset of key-phrases of a segment with each key-phrase in the second subset of key-phrases of a temporally subsequent segment. In an embodiment, the processor 202 may utilize one or more similarity measures, such as cosine similarity, Euclidian distance, Lavenshtein distance, and/or the like, to determine the compatibility score. For example, the processor 202 may determine "n" compatibility scores for an $i^{th}$ key-phrase in the second subset of key-phrases of a $j^{th}$ segment, where "n" may be equal to a count of key-phrases in a second subset of key-phrases of a segment that is temporally subsequent to the $j^{th}$ segment.

In an embodiment, the processor 202 may formulate a linear program problem with one or more constraints for the selection of at least a key-phrase from the second subset of key-phrases of each of the corresponding one or more segments.

In an exemplary implementation, the processor 202 may formulate the linear program problem for the selection of at least a key-phrase from the second subset of key-phrases of each of the corresponding one or more segments using the following one or more constraints:

$$\text{maximize } \Sigma_{ij} l_{ij} x_{ij} + \Sigma_{ij} \Sigma_{lm} x_{ij} x_{lm} A(c_{ij}, c_{lm}) \quad (1)$$

$$s \cdot t \cdot \Sigma_{i=1}^{|S_i|} x_{ij} = 1 \forall j \in [1 \ldots K] \quad (2)$$

$$x_{ij} x_{lm} A(c_{ij}, c_{lm}) < 0 \forall j > m, \forall i \in [1 \ldots |S_i|], l \in [1 \ldots |S_m|] \quad (3)$$

$$x_{ij} x_{lm} A(c_{ij}, c_{lm}) > 0 \forall j < m, \forall i \in [1 \ldots |S_i|], l \in [1 \ldots |S_m|] \quad (4)$$

$$x_{ij}, x_{lm} \in 0, 1 \quad (5)$$

where,

K corresponds to a count of the one or more segments of the multimedia content;

$|S_i|$ corresponds to a count of key-phrases in a second subset of key-phrases of an $i^{th}$ segment in the one or more segments of the multimedia content;

$x_{ij}$ represents a Boolean variable that indicates whether an $i^{th}$ key-phrase, in the second subset of key-phrases of a $j^{th}$ segment in the one or more segments, corresponds to a selected key-phrase. For example, if an $i^{th}$ key-phrase, in the second subset of key-phrases of a $j^{th}$ segment in the one or more segments, corresponds to a selected key-phrase, $x_{ij}=1$, else $x_{ij}=0$;

$x_{lm}$ represents a Boolean variable that indicates whether an $l^{th}$ key-phrase, in the second subset of key-phrases of an $m^{th}$ segment in the one or more segments, corresponds to a selected key-phrase;

$l_{ij}$ corresponds to the second score of an $i^{th}$ key-phrase, in the second subset of key-phrases of a $j^{th}$ segment in the one or more segments;

$A(c_{ij}, c_{lm})$ corresponds to the compatibility score between an $i^{th}$ key-phrase, in the second subset of key-phrases of a $j^{th}$ segment, and an $l^{th}$ key-phrase, in the second subset of key-phrases of an $m^{th}$ segment, such that the $m^{th}$ segment is temporally subsequent to the $j^{th}$ segment.

As shown above, the linear program problem is represented in Equation (1), while the one or more constraints to the linear program problem are represented in Equations (2)-(5). In an embodiment, the aim of the linear program problem (i.e., Equation (1)) is to maximize the relevancy of a key-phrase for the selection. Equation (2) represents a constraint that only one key-phrase may be selected from a second subset of key-phrases of a segment in the one or more segments. Equation (3) represents a constraint that if the compatibility score between an $i^{th}$ key-phrase, in the second subset of key-phrases of a $j^{th}$ segment and an $l^{th}$ key-phrase, in the second subset of key-phrases of an $m^{th}$ segment is greater than zero, then $j^{th}$ segment is temporally prior to the $m^{th}$ segment. Equation (4) represents a constraint that if the compatibility score between an $i^{th}$ key-phrase, in the subset of key-phrases of a $j^{th}$ segment and an $l^{th}$ key-phrase, in the subset of key-phrases of an $m^{th}$ segment is less than zero, then $j^{th}$ segment is temporally subsequent to the $m^{th}$ segment. Further, Equation (3) and Equation (4) utilizes the sequence of topics in the directed sub-graph. Equation (5) represents a constraint that $x_{ij}$ and $x_{lm}$ are Boolean variables. Further, based on the linear program problem, the processor 202 may be configured to select one key-phrase from the second subset of key-phrases of each of the corresponding one or more segments.

A person having ordinary skill in the art will understand that the abovementioned exemplary implementations are for illustrative purpose and should not be construed to limit the scope of the disclosure.

At step 318, the table of content is generated based on the selected key-phrase from each of the one or more segments. In an embodiment, the processor 202 may be configured to generate the table of content based on the selected key-phrase from each of the one or more segments. In an embodiment, the selected key-phrase from each of the one or more segments in the generated table of content may be temporally sequenced. For example, a selected key-phrase with a timestamp, such as "00:10:00," may occur prior to another selected key-phrase with a timestamp, such as "00:15:00," in the table of content.

After the generation of the table of content, in an embodiment, the processor 202 may be configured to insert/embed the generated table of content in the multimedia content. Thereafter, the transceiver 206 may be configured to present the generated table of content to the user, associated with the user-computing device 102, through the user-interface. In an embodiment, the transceiver 206 may transmit the multimedia content with the generated table of content to the user-computing device 102 associated with the user. Thereafter, the user may navigate through the multimedia content by utilizing the selected key-phrase in the generated table of content. For example, a selected key-phrase in the table of content may be associated with a timestamp, such as "00: 10:00." Thus, when the user clicks on the selected key-phrase, control navigates to the corresponding temporal location (i.e., "00:10:00"), associated with the timestamp, of the multimedia content. Control passes to the end step 320.

A person having ordinary skill in the art will understand that the abovementioned example is for illustrative purpose and should not be construed to limit the scope of the disclosure.

Figure 4:
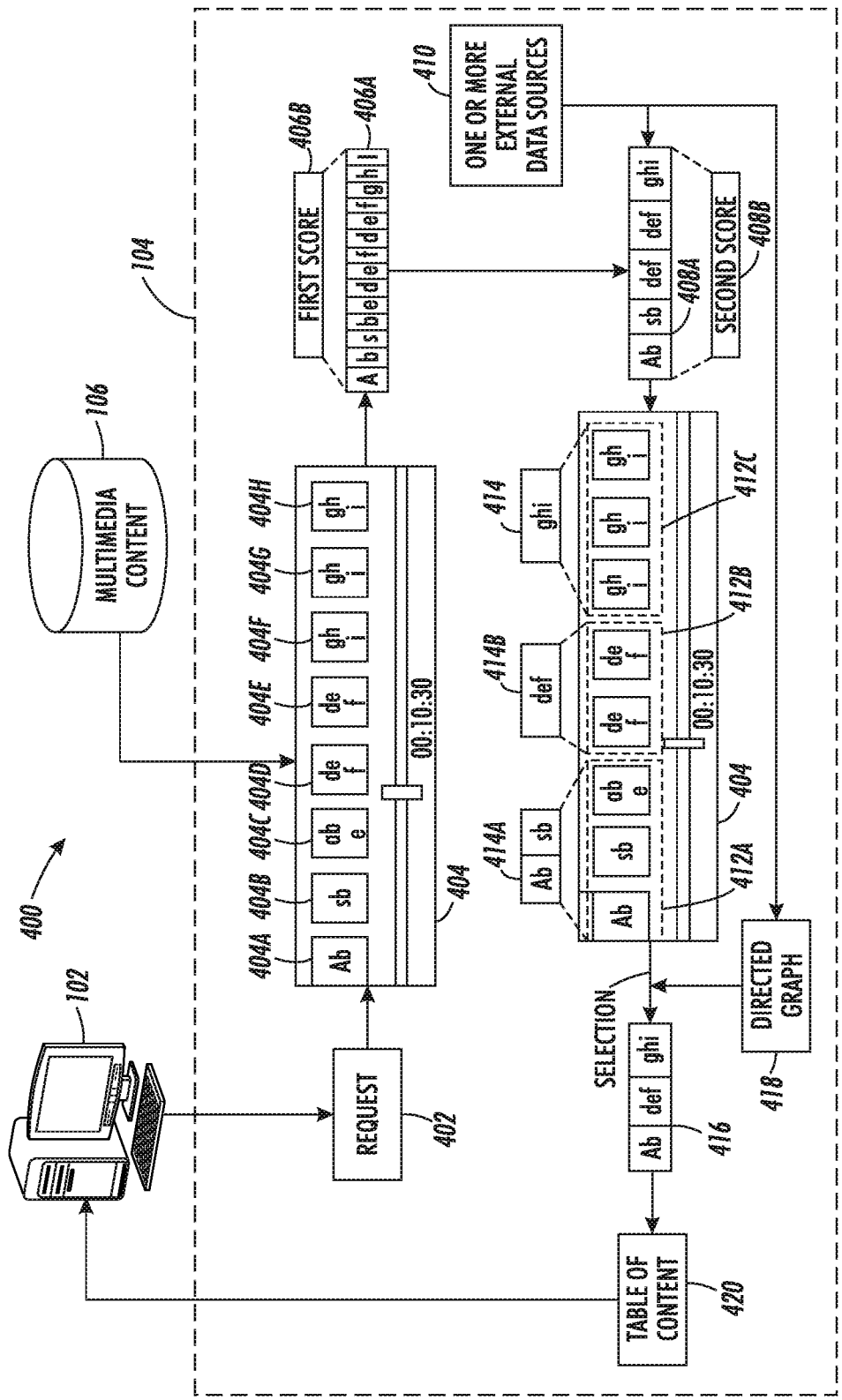
FIG. 4 is block diagram that illustrates an exemplary scenario for generation of a table of content, in accordance with at least one embodiment.

FIG. 4 is block diagram that illustrates an exemplary scenario for generation of a table of content, in accordance with at least one embodiment. FIG. 4 has been described in conjunction with FIGS. 1-3. With reference to FIG. 4, there is shown an exemplary scenario 400 for the generation of the table of content.

With reference to FIG. 4, there is shown a user-computing device, such as the user-computing device 102, associated with a user 102A. The user 102A may transmit a request 402 for the generation of a table of content to the application server 104 by utilizing the user-computing device 102. The request 402 may comprise an identification parameter for multimedia content 404 for which the table of content is to be generated. Thereafter, based on the identification parameter, the application server 104 may query the database server 106 to retrieve the multimedia content 404. The multimedia content 404 may comprise a plurality of frames, such as frames 404A to 404H.

After the retrieval of the multimedia content 404, the application server 104 may identify a plurality of keywords 406A from the multimedia content 404. The application server 104 may utilize one or more text identification techniques, such as OCR technique and HCR technique, for the identification of the plurality of keywords 406A. In an embodiment, the plurality of keywords 406A may be associated with text content and/or audio content of the multimedia content 404. Thereafter, the application server 104 may determine a first score 406B for each of the plurality of keywords 406A. In an embodiment, the application server 104 may determine the first score 406B based on a visual saliency and/or textual saliency associated with each of the plurality of keywords 406A. The application server 104 may determine the visual saliency based on one or more aesthetic features associated with each of the plurality of keywords 406A. Further, the application server 104 may determine the textual saliency of each of the plurality of keywords 406A based on a first weighted graph.

After determining the first score 406B, the application server 104 may identify a set of key-phrases 408A from the multimedia content 404. The application server 104 may identify the set of key-phrases 408A based on one or more external data sources 410. Examples of the one or more external data sources 410 may include, but are not limited to, Wikipedia®, textbooks, and Wordnet. In an embodiment, a key-phrase, such as "A b," in the set of key-phrases 408A may be indicative of a topic in a plurality of topics in the one or more external data sources 410. Further, the application server 104 may determine a timestamp for each key-phrase in the set of key-phrases 408A. The determined timestamp for each key-phrase may be indicative of an occurrence of each key-phrase in the multimedia content 404. Further, each key-phrase, such as "A b," in the set of key-phrases 408A comprises a corresponding set of keywords, such as "A" and "b," from the plurality of keywords 406A. Thereafter, the application server 104 may determine a second score 408B for each key-phrase in the set of key-phrases 408A. The second score 408B of each key-phrase, such as "A b," is determined based on the first score 406B of each keyword in the corresponding set of keywords, such as "A" and "b."

Thereafter, the application server 104 may determine one or more homogenous segments of the multimedia content 404. Each of the one or more homogeneous segments comprises a first subset of key-phrases from the set of key-phrases 408A. Thereafter, the application server 104 may determine the one or more segments, such as segments 412A, 412B, and 412C, of the multimedia content 404 based on the identified set of key-phrases 408A. Further, each of the one or more segments, such as segments 412A, 412B, and 412C, comprises a set of the homogenous segments from the one or more homogenous segments. Further, each of the one or more segments, such as segments 412A, 412B, and 412C, comprises a second subset of key-phrases, such as subsets 414A, 414B, and 414C, respectively, from the set of key-phrases 408A, such that the second subset of key-phrases, such as 414A, for a segment, such as 412A, includes the first subset of key-phrases of the corresponding homogeneous segments.

After determining the one or more segments, the application server 104 may rank each key-phrase in the second subset of key-phrases, such as subsets 414A, 414B, and 414C, associated with each of the one or more segments, such as segments 412A, 412B, and 412C. In an embodiment, the ranking of the key-phrases in the second subset of key-phrases is based on the second score 408B associated with each key-phrase in the second subset of key-phrases, such as subsets 414A, 414B, and 414C. Thereafter, the application server 104 may select at least a key-phrase 416 from the second subset of key-phrases of each of the corresponding one or more segments, such as segments 412A, 412B, and 412C. The application server 104 may utilize a sequence of topics in a directed graph 418 for the selection of the key-phrase from each of the one or more segments, such as segments 412A, 412B, and 412C. In an embodiment, the application server 104 may generate the directed graph 418 based on the one or more external data sources 410.

Thereafter, the application server 104 may generate the table of content 420 based on the selected key-phrase 416 from each of the one or more segments, such as segments 412A, 412B, and 412C. The selected key-phrase from each of the one or more segments, such as segments 412A, 412B, and 412C, in the generated table of content 420 are temporally sequenced. Further, the application server 104 may present the generated table of content 420 to the user 102A, associated with the user-computing device 102, through a user-interface (not shown). Thereafter, the user 102A may navigate through the multimedia content 404 by utilizing the selected key-phrase 416 in the generated table of content 420.

A person having ordinary skill in the art will understand that the scope of the abovementioned exemplary scenario is for illustrative purpose and should not be construed to limit the scope of the disclosure.

Figure 5:
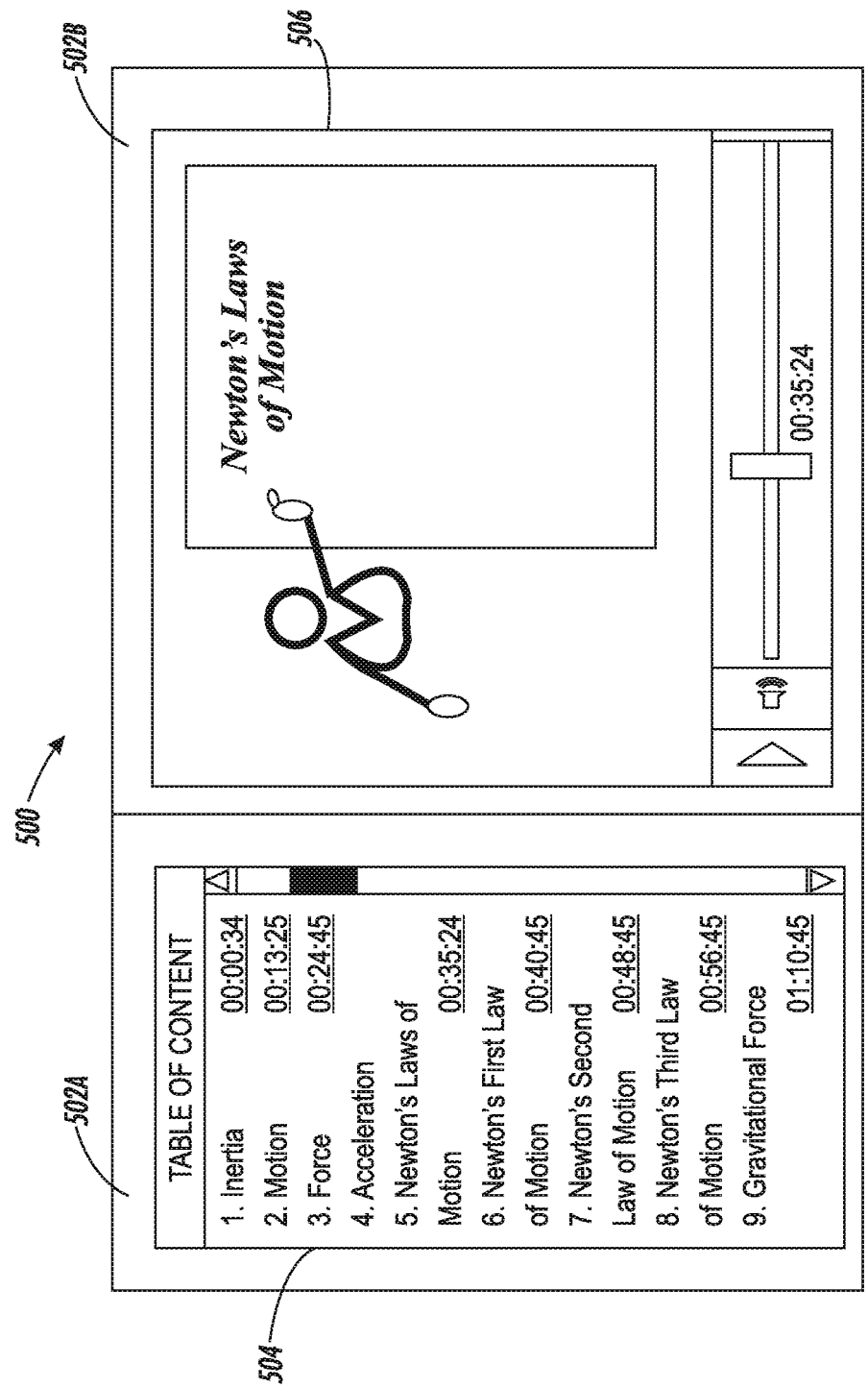
FIG. 5 is a block diagram that illustrates an exemplary Graphical User Interface (GUI) presented on a user-computing device to display generated table of content, in accordance with at least one embodiment.

FIG. 5 is a is a block diagram that illustrates an exemplary Graphical User Interface (GUI) presented on a user-computing device to display generated table of content, in accordance with at least one embodiment. FIG. 5 is described in conjunction with FIGS. 1-4. With reference to FIG. 5, there is shown an exemplary GUI 500 presented on a user-computing device to display the generated table of content.

The GUI 500 is displayed on the user-computing device 102. The GUI 500 comprises a first display area 502A and a second display area 502B. The first display area 502A displays a table of content 504 and the second display area 502B displays the multimedia content 506. The table of content 504 comprises selected key-phrases, from the multimedia content, with corresponding timestamps. The user associated with the user-computing device 102 may navigate through the multimedia content 506 by utilizing the selected key-phrases in the table of content 504. For example, the user associated with the user-computing device 102 may click on the selected key-phrase, such as "Newton's Laws of Motion" with timestamp "00:35:24," in the table of content 504 to navigate at a corresponding temporal location (i.e., "00:35:24") in the multimedia content. In an embodiment, the second display area 502B may contain command buttons such as, play, rewind, forward, and pause, to control playback of the multimedia content. In an embodiment, a navigation bar may be displayed on the second display area 502B that enables the user to navigate through the multimedia content 506.

The disclosed embodiments encompass numerous advantages. The disclosure provides a method and a system for generation of a table of content by processing multimedia content. The disclosed method and system utilizes visual saliency and textual saliency associated with the visual content and/or the audio content in the multimedia content for the generation of the table of content. Further, the disclosed method and system utilizes prior knowledge from one or more external data sources, such as Wikipedia®, textbooks, Wordnet, and/or the like, to create the table of content. Further, the disclosed method and system automatically selects temporally sequential key-phrases from the multimedia content based on the one or more external data sources for the generation of the table of content. The key-phrases in the table of content may be utilized by a user to navigate through the multimedia content. The disclosed method and system provides a robust and fast alternative to manual generation of table of content for the multimedia content. The disclosed method and system may be utilized by an education provider that uses multimedia content as a mode of education.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for generation of a table of content by processing multimedia content have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method of generation of a table of content by processing multimedia content in a computing device, the method comprising:
   identifying, by one or more processors in the computing device, a set of key-phrases from the multimedia content based on one or more external data sources, wherein the multimedia content is selected based on a request received from a user-computing device associated with a user;
   determining, by the one or more processors in the computing device, one or more segments of the multimedia content, based on the identified set of key-phrases, wherein a segment of the determined one or more segments comprises a subset of key-phrases from the set of key-phrases;
identifying, by the one or more processors in the computing device, a plurality of keywords from the multimedia content by utilizing one or more text identification techniques;
determining by the one or more processors in the computing device, a first score for each of the identified plurality of keywords based on one or both of a visual saliency and a textual saliency associated with each of the plurality of keywords
selecting, by the one or more processors in the computing device, at least a key-phrase from the subset of key-phrases of each of the corresponding one or more segments by utilizing a sequence of topics in a directed graph, wherein the directed graph is determined based on the one or more external data sources; and
generating, by the one or more processors in the computing device, the table of content based on the selected key-phrase from each of the one or more segments, wherein the selected key-phrase from each of the one or more segments in the generated table of content is temporally sequenced and utilized to navigate through the multimedia content, wherein the generated table of content is presented to the user through a user-interface.

2. The methods of claim 1, wherein each key-phrase in the set of key-phrases comprises a corresponding set of keywords from the plurality of keywords, wherein each key-phrase of the set of key-phrases is associated with a corresponding timestamp that is indicative of an occurrence of the key-phrase in the multimedia content.

3. The method of claim 2, further comprising determining, by the one or more processors in the computing device, a second score for each key-phrase in the set of key-phrases, based on the first score of each keyword in the set of keywords in the corresponding key-phrase.

4. The method of claim 3, further comprising ranking, by the one or more processors in the computing device, each key-phrase in the subset of key-phrases associated with each of the one or more segments, based on the second score associated with each key-phrase in the subset of key-phrases.

5. The method of claim 3, where the selection of the key-phrase from the subset of key-phrases of each of the corresponding one or more segments is further based on the second score associated with each key-phrase in the subset of key-phrases.

6. The method of claim 1, wherein a segment of the one or more segments is associated with a topic of one or more topics in the multimedia content.

7. The method of claim wherein the directed graph comprises one or more nodes, wherein a node in the one or more nodes is associated with a topic of a plurality of topics in the one or more external data sources.

8. A system for by processing multimedia content in a computing device, the system comprising:
one or more processors in the computing device configured to:
identify a set of key-phrases from the multimedia content based on one or more external data sources, wherein the multimedia content is selected based on a request received from a user-computing device associated with a user;
determine one or more segments of the multimedia content, based on the identified set of key-phrases, wherein a segment of the determined one or more segments comprises a subset of key-phrases from the set of key-phrases;
identify a plurality of keywords from the multimedia content by utilizing one or more text identification techniques;
determine a first score for each of the identified plurality of keywords based on one or both of a visual saliency and a textual saliency associated with each of the plurality of keywords;
select at least a key-phrase from the subset of key-phrases of each of the corresponding one or more segments by utilizing a sequence of topics in a directed graph, wherein the directed graph is determined based on the one or more external data sources; and
generate the table of content based on the selected key-phrase from each of the one or more segments, wherein the selected key-phrase from each of the one or more segments in the generated table of content is temporally sequenced and utilized to navigate through the multimedia content, wherein the generated table of content is presented to the user through a user-interface.

9. The system of claim 8, wherein each key-phrase in the set of key-phrases comprises a corresponding set of keywords from the plurality of keywords, wherein each key-phrase of the set of key-phrases is associated with a corresponding timestamp that is indicative of an occurrence of the key-phrase in the multimedia content.

10. The system of claim 9, wherein the one or more processors in the computing device are further configured to determine a second score for each key phrase in the set of key-phrases, based on the first score of each keyword in the set of keywords in the corresponding key-phrase.

11. The system of claim 10, wherein the one or more processors in the computing device are further configured to rank each key-phrase in the subset of key-phrases associated with each of the one or more segments, based on the second score associated with each key-phrase in the subset of key-phrases.

12. The system of claim 10, where the selection of the key-phrase from the subset of key-phrases of each of the corresponding one or more segments is further based on the second score associated with each key-phrase in the subset of key-phrases.

13. The system of claim 8, wherein a segment of the one or more segments is associated with a topic of one or more topics in the multimedia content.

14. The system of claim 8, wherein the directed graph comprises one or more nodes, wherein a node in the one or more nodes is associated with a topic of a plurality of topics in the one or more external data sources.

15. A computer program product for use with a computer, the computer program product comprising a non-transitory computer readable medium, wherein the non-transitory computer readable medium stores a computer program code for generation of a table of content by processing multimedia content, Wherein the computer program code is executable by one or more processors in a computing device to:
identify a set of key-phrases from the multimedia content based on one or more external data sources, wherein the multimedia content is selected based on a request received from a user-computing device associated with a user;
determine one or more segments of the multimedia content, based on the identified set of key-phrases, wherein a segment of the determined one or more segments comprises a subset of key-phrases from the set of key-phrases;

identify a plurality of keywords from the multimedia content by utilizing one or more text identification techniques;

determine a first score for each of the identified plurality of keywords based on one or both of a visual saliency and a textual saliency associated with each of the plurality of keywords;

select at least a key-phrase from the subset of key-phrases of each of the corresponding one or more segments by utilizing a sequence of topics in a directed graph, ;herein the directed graph is determined based on the one or more external data sources; and generate the table of content based on the selected key-phrase from each of the one or more segments, wherein the selected key-phrase from each of the one or more segments in the generated table of content is temporally sequenced and utilized to navigate through the multimedia content, wherein the generated table of content is presented to the user through a user-interface.

* * * * *